United States Patent
Bareis et al.

(10) Patent No.: US 8,019,387 B2
(45) Date of Patent: *Sep. 13, 2011

(54) SPEECH RECOGNITION SYSTEM FOR ELECTRONIC SWITCHES IN A NON-WIRELINE COMMUNICATIONS NETWORK

(75) Inventors: Bernard F. Bareis, Dallas, TX (US);
Peter J. Foster, Dallas, TX (US);
Thomas B. Schalk, Dallas, TX (US)

(73) Assignee: Nuance Communications, Inc., Burlington, MA (US)

( * ) Notice: Subject to any disclaimer, the term of this patent is extended or adjusted under 35 U.S.C. 154(b) by 39 days.

This patent is subject to a terminal disclaimer.

(21) Appl. No.: 12/326,753

(22) Filed: Dec. 2, 2008

(65) Prior Publication Data

US 2009/0074157 A1    Mar. 19, 2009

Related U.S. Application Data (60) Continuation of application No. 10/308,653, filed on Dec. 3, 2002, now Pat. No. 7,551,944, which is a division of application No. 09/722,810, filed on Nov. 27, 2000, now Pat. No. 6,501,966, and a continuation of application No. 07/867,873, filed on Apr. 13, 1992, now Pat. No. 5,297,183.

(51) Int. Cl.
*H04B 1/38* (2006.01)
(52) U.S. Cl. .................. 455/563; 455/560; 455/564
(58) Field of Classification Search ............. 455/414.1, 455/563, 564, 560
See application file for complete search history.

(56) References Cited

U.S. PATENT DOCUMENTS

4,873,714 A * 10/1989 Ishii et al. .................. 379/88.03
* cited by examiner

*Primary Examiner* — Temica M Beamer
(74) *Attorney, Agent, or Firm* — Sunstein Kann Murphy & Timbers LLP (57) ABSTRACT

Voice activated dialing is described for use in a mobile telecommunications system. A voice input is received from a wireless network user. A telephone number to be dialed is determined by using speaker independent speech recognition to interpret a string of spoken digits in the voice input to determine the telephone number, or using speaker dependent speech recognition to interpret a spoken word in the voice input to determine the telephone number. A telephone call is then initiated by dialing the telephone number.

14 Claims, 12 Drawing Sheets

FIG. 3   SPEECH RECOGNITION SYSTEM DIAGRAM

SPEECH RECOGNITION SYSTEM FOR ELECTRONIC SWITCHES IN A NON-WIRELINE COMMUNICATIONS NETWORK

CROSS REFERENCE TO RELATED APPLICATION

This application is a continuation of co-pending application U.S. Ser. No. 10/308,653, filed Dec. 3, 2002, which is a divisional of application U.S. Ser. No. 09/722,810, filed Nov. 27, 2000, now U.S. Pat. No. 6,501,966; which is a continuation of application U.S. Ser. No. 07/867,873, filed Apr. 13, 1992, now U.S. Pat. No. 5,297,183; all of which are incorporated herein by reference.

FIELD OF THE INVENTION

This invention is related to telecommunications systems, and more particularly to an electronic digital signal processor-controlled telecommunications system for the recognition of spoken commands and for the directing of telephone calls based on spoken commands.

BACKGROUND ART

It is well-known that many of the safety hazards of cellular telephone use could be alleviated by utilizing automatic speech recognition. While telephone-based speech recognition systems are known, cellular voice dialing over a mobile telephone exchange ("MTX") presents significant challenges for two basic reasons. First, the recognition technology must accommodate a tremendous range of both remotely-mounted and hand-held microphone types. Second, the signal may be band-limited and degraded in transmission to the MTX where the recognition system will be located. Voice-controlled dialers of the prior art, such as taught in U.S. Pat. No. 4,853,953 to Fujisaki, have not been successfully implemented in the cellular environment.

There is therefore a need for voice recognition systems for use in the cellular, satellite and personal communications network environments that overcome these and other problems of the prior art and that facilitate the use of voice-dialing and other safety and convenience features.

SUMMARY OF THE INVENTION

It is therefore an object of the present invention to describe an implementation of a speech recognition system in a cellular or personal communications network environment.

It is a further object of the invention to describe a speech recognition system for use at a mobile telephone exchange (MTX) of a cellular or personal communications network. The placement of the speech recognition system at the MTX significantly reduces cost and increases reliability by enabling the switch vendor to install and maintain the system in conjunction with the cellular switch.

It is another object of the invention to describe a cellular voice dialing system for use in or in conjunction with an MTX of a cellular network.

It is still another object of the invention to use voice recognition techniques to secure access to a cellular or personal communications network.

Another object of the invention is to provide for combined use of speaker-dependent and speaker-independent voice recognition and speaker verification techniques in an MTX of a cellular or personal communications telephone network.

These and other objects of the invention are provided in an advanced system for the recognizing of spoken commands over the cellular telephone or any personal communications (i.e., any non-wireline) network. In the cellular application, for example, a Speech Recognition System interconnects either internally with or as an external peripheral to a cellular telecommunications MTX switch. The Speech Recognition System includes an administrative subsystem, a call processing subsystem, a speaker-dependent recognition subsystem, a speaker-independent recognition subsystem, and a data storage subsystem. The Speech Recognition System also allows for increased efficiency in the cellular telephone network by integrating with the switch or switches as a shared resource. The administrative sub-system of the Speech Recognition System is used to keep statistical logs of pertinent call information. Pre-recorded instructional messages are stored in the memory of the call processing subsystem for instructing a user on his or her progress in using the system. The speaker-independent recognition subsystem allows the user to interact with the system employing non-user specific functions. User specific functions are controlled with the speaker-dependent recognition subsystem. User specific attributes collected by the recognition subsystems are stored in the data storage sub-system.

The foregoing has outlined some of the more pertinent objects of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the preferred embodiment.

BRIEF DESCRIPTION OF THE DRAWINGS

For a more complete understanding of the present invention and the advantages thereof, reference should be made to the following Detailed Description taken in connection with the accompanying drawings in which.

Similar reference characters refer to similar parts or steps throughout the several drawings.

DETAILED DESCRIPTION OF SPECIFIC EMBODIMENTS

Figure 1:
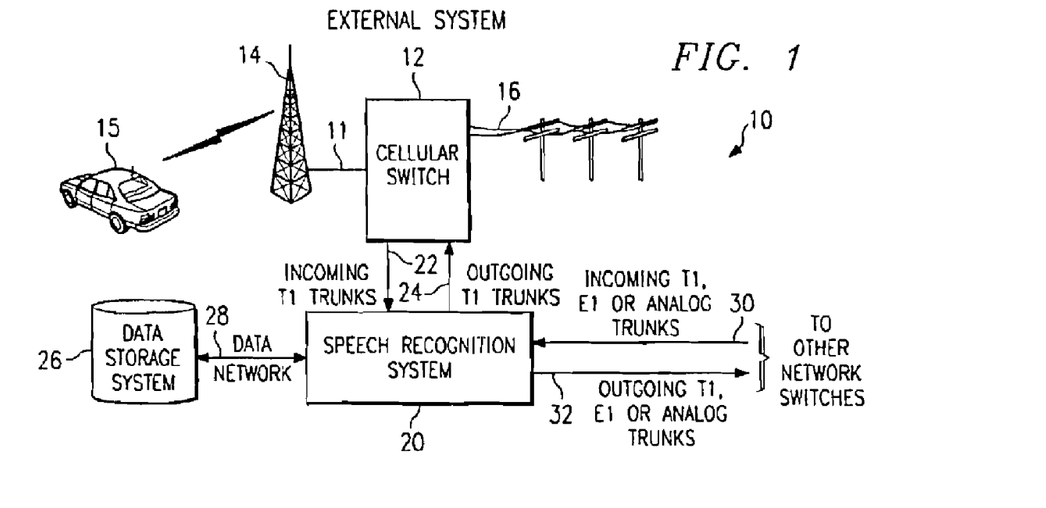
FIG. 1 is a block diagram of a cellular telephone network incorporating an external switch-based Speech Recognition System according to the present invention.

FIG. 1 is a block diagram of a cellular telephone network incorporating an external switch-based Speech Recognition System according to the present invention. Although the following description is specifically related to use of the Speech Recognition System at or in conjunction with an MTX of a cellular network, it should be appreciated that the System also interconnects either internally with or as an external peripheral to a personal communications network. Indeed, the principles of the invention are applicable to any cellular-like network application, i.e., where a non-wireline communications network is employed for mobile, satellite, portable or personal communications. The Speech Recognition System can also be used as a shared resource through integration with a plurality of such non-wireline communications networks.

Referring now to FIG. 1, an exemplary telephone network is a cellular network 10 having a mobile telephone exchange (MTX) switch 12 connected to a transceiver and an antenna 14. The transceiver is located in each cell of the cellular network and communicates with the MTX to effect transmission and reception of signals to and from the mobile telephone located in vehicle 15. The transceiver is typically connected to the MTX via a leased or dedicated network line 11. The MTX 12 is typically connected to the land-based destinations via telephone network 16.

A cellular mobile telecommunications system connects mobile telecommunications customers, each having a mobile unit, to land-based customers served by a telephone network. Incoming and outgoing calls are routed through a mobile telecommunications switching office connected to a group of cell sites that communicate with mobile units. The mobile telecommunications switching office includes a mobile telephone switching exchange (MTX) for routing the calls between the mobile units and the telephone network. In a typically mobile cellular communications system, there are usually many cells per MTX and several MTX's per system. As used herein, "mobile telecommunications system" refers to cellular, satellite and personal communications network environments.

Each cellular telephone is uniquely identified by two numbers: a serial number ("ESN") encoded in the phone by its manufacturer, and a mobile identification number ("MIN"), which is the cellular telephone number programmed in by the cellular service provider. The service provider operates the MTX 12 and keeps a database of all MIN's (and their associated ESN's). Each time a call is placed by the cellular telephone, the service provider verifies whether the MIN and the associated ESN are authorized. If the MIN and ESN of a cellular phone are not recognized (and the area code or NPA of the MIN indicates that the phone number is outside of the provider's service area), the provider normally allows the call to proceed at least one time. If billing authorization cannot later be verified, however, the MIN and serial number are then placed on an exception list. Subsequent attempts to use the MIN will then be rejected.

According to one embodiment of the invention as shown in FIG. 1, a Speech Recognition System 20 is connected as an external peripheral to the MTX through a set of preferably digital trunk lines. Set 22 is used for incoming signals and set 24 is used for outgoing signals. Other types of signaling, such as CEPT E1 or analog, may also be used besides T1. The Speech Recognition System 20 is connected to a dedicated data storage subsystem 26 through a data network 28. The data storage subsystem is used to store recognition data derived from the subscribers to the voice dialing service as will be described. The Speech Recognition System 20 may be integrated with one or more switches (whether or not cellular) for use as a shared resource via incoming and outgoing trunk sets 30 and 32.

Figure 2:
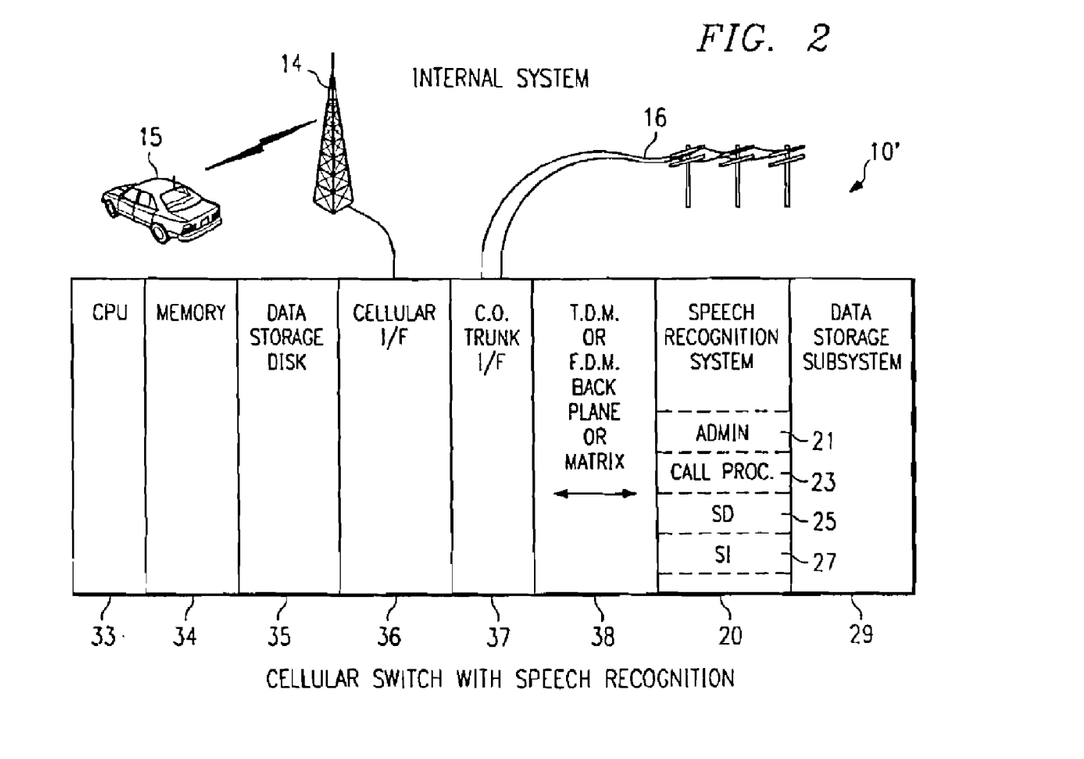
FIG. 2 is a block diagram of a cellular telephone network incorporating an internal switch-based Speech Recognition System.

Referring now to FIG. 2, a block diagram shows the cellular telephone network 10' with the Speech Recognition System 20 interconnected internally to the MTX. This is the preferred embodiment of the invention. The hierarchical architecture of the cellular switch includes the central processing unit 33, memory 34, data storage disk 35, cellular interface 36, central office trunk interface 37 and a backplane or switching matrix 38.

The Speech Recognition System 20 includes a number of functional subsystems: an administrative sub-system 21, a call processing subsystem 23, a speaker-dependent recognition subsystem 25, a speaker-independent recognition subsystem 27, and the data storage subsystem 29 (which corresponds to the storage system 26 of FIG. 1). The administrative subsystem 21 of the Speech Recognition System is used to keep statistical logs of pertinent call information. Pre-recorded instructional messages are stored in the memory of the call processing subsystem 23 for instructing a user on his or her progress in using the system. The speaker-independent recognition subsystem 27 allows the user to interact with the system employing non-user specific functions. User specific functions are controlled with the speaker-dependent recognition subsystem 25. User specific attributes collected by the recognition subsystems are stored in the data storage subsystem 29.

Figure 3:
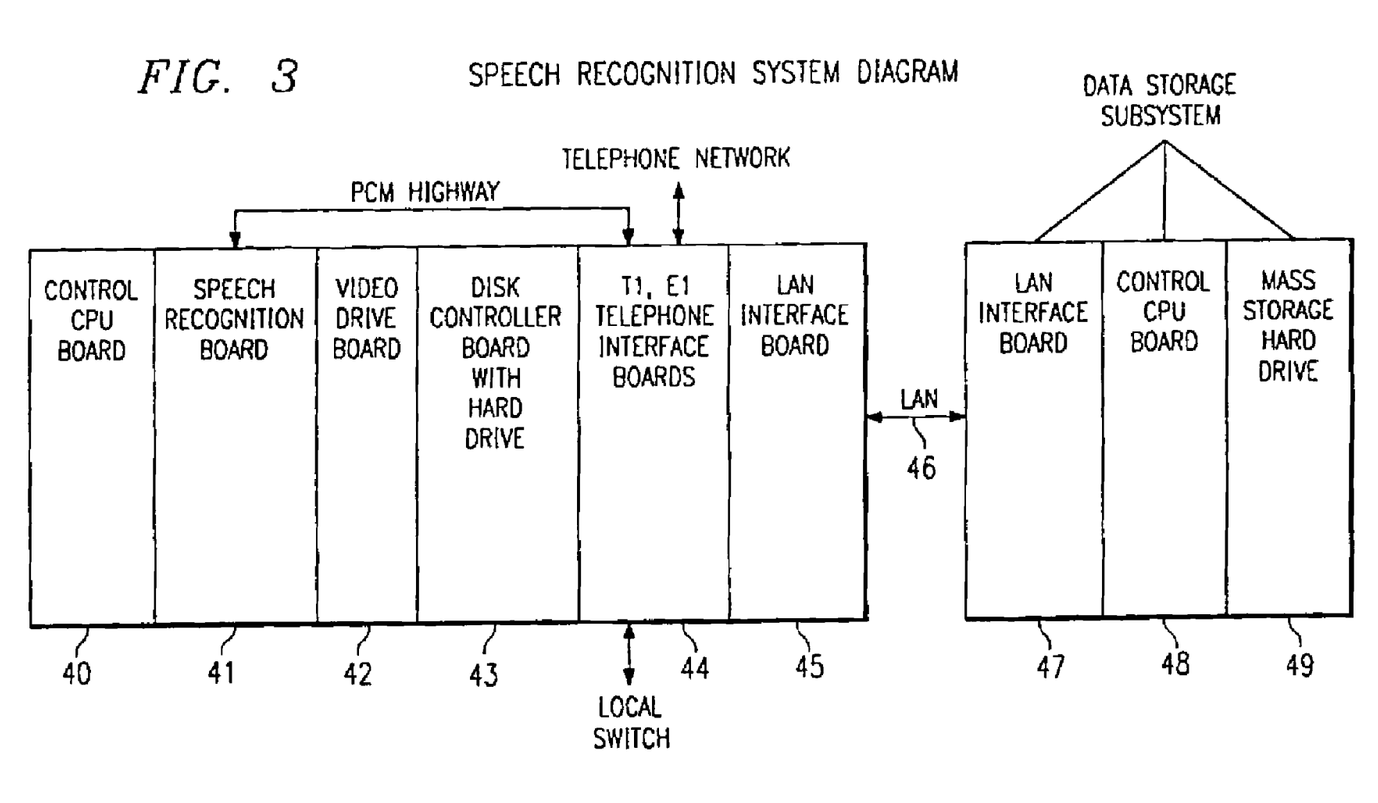
FIG. 3 is an upper level block diagram of the Speech Recognition System and data storage subsystem of FIG. 1.

FIG. 3 is an upper level block diagram of the Speech Recognition System of FIG. 1. The hierarchical architecture of the System 20 comprises a control central processing unit 40, a speech recognizer board 41, a video drive circuit board 42, a disk drive controller board 43 with associated hard disk drive, telephone interface circuit boards 44, and a local area network ("LAN") interface board 45. A local area network 46 connects these components of the System to the data storage subsystem 29, which comprises a LAN interface board 47, a CPU control board 48 and a mass storage hard drive device 49. As also seen in FIG. 3, a pulse code modulation ("PCM") highway connects the telephone interface boards 44 to the speech recognition board 41. The MTX is also connected to the System 20 through the interface boards 44.

The CPU 40 and associated control programs function as the system administrative subsystem 21 of FIG. 2. The recognizer board 41 acts as the recognition call processing subsystem 23 and the recognition subsystems 25 and 27. Command and control functions are communicated to the recognizer board 41 from the system administrative processor 40 to the recognition call processing subsystem through a system bus. Responses received by the administrative processor from the recognition subsystem indicate primary and secondary recognition responses, error codes and command acknowledgements.

Figure 4:
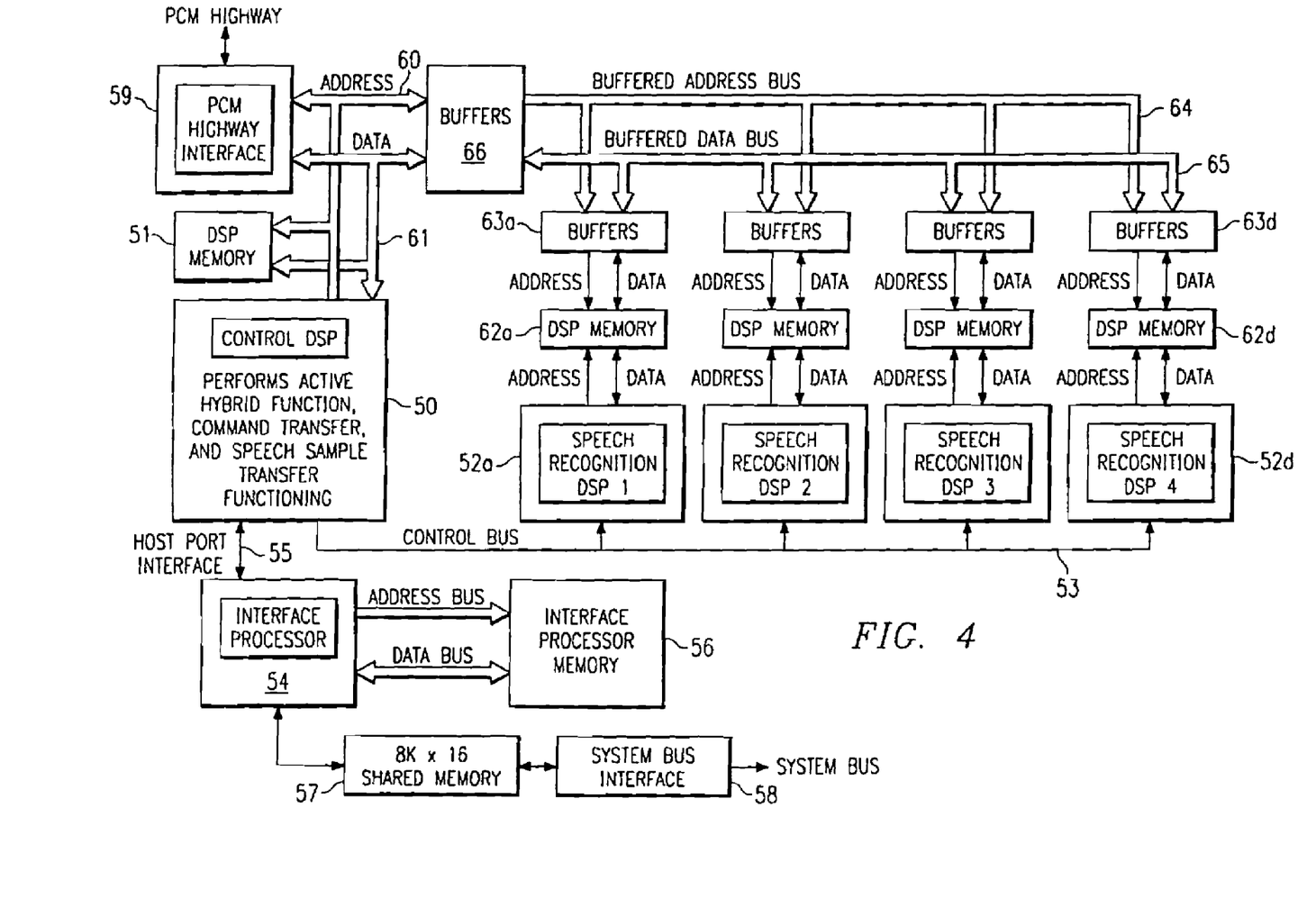
FIG. 4 is a detailed component diagram of the speech recognizer board of the Speech Recognition System of FIGS. 2 and 3.

Referring now to FIG. 4, a more detailed schematic diagram is shown of the recognizer board 41 of FIG. 3 and modules 25 and 27 of FIG. 2. The recognizer includes a control digital signal processor ("DSP") 50 having an associated memory 51 for supporting control programs and data. The control DSP 50 in this embodiment of the invention controls a plurality of speech recognition digital signal processors 52a ... 52d via a control bus 53. The control DSP 50 also connects to an interface processor 54 via a host port interface 55. Interface processor 54 has its own processor memory 56. A buffer 57 interconnects the interface processor to a system bus interface circuit 58 that interconnects the recognizer board to the system bus.

The PCM highway of FIG. 3 or backplane of FIG. 2 is connected to a PCM highway interface circuit 59 that supplies speech sample information to the control DSP 50 and memory 51 via address and data bases 60 and 61. Each of the speech recognition DSP's 52a ... 52d has an associated memory 62a ... 62d and storage buffer 63a ... 63d. Buffered address and data buses 64 and 65 interconnect to the address and data buses 60 and 61 through the buffers 66.

The interface processor 64 converts batch system commands or command blocks received through the system bus interface 58 into singular commands for the control DSP 50. Similarly, singular responses from the control DSP 50 are buffered by the interface processor 54 and are sent to the administrative processor (of FIGS. 2 and 3) in code blocks to increase overall system efficiency.

All telephone channel signaling and PCM highway sample transfer is handled by the control DSP 50 through the PCM highway interface 59. The control DSP 50 is also used to send samples and commands to the four speech recognition DSP's 52a ... 52d. Additionally, the DSP's 52 can function to stop outgoing messages based on detection of certain incoming speech energy.

The system data flow is such that recognition commands and responses are sent to and from the administrative processor and the speech recognition DSP's 52 through the control DSP 50, the interface processor 54, and the system bus interface 58. Speech samples are received by the speech recognition DSP's 52 through the PCM highway interface 59 and the control DSP 50.

The present invention facilitates the implementation of voice-dialing in a cellular telephone or other personal communications network environment. When a user "subscribes" to the service (e.g., with the MTX service provider), it is desirable that certain speech data be collected from the subscriber for security purposes. Thus, upon subscription, the user normally will be asked to provide his or her native language (e.g., English, Spanish, French, etc.), a personal identification number, and personal information related specifically to the subscriber such as a social security number or date of birth. This latter information may be used in an automated query process as will be described to prevent fraudulent use of the cellular or personal telephone network. Once the user information is activated in the system, the user may place or receive telephone calls. Initially, the user will be required to enter speed-dial numbers and their associated directory names.

Figure 5:
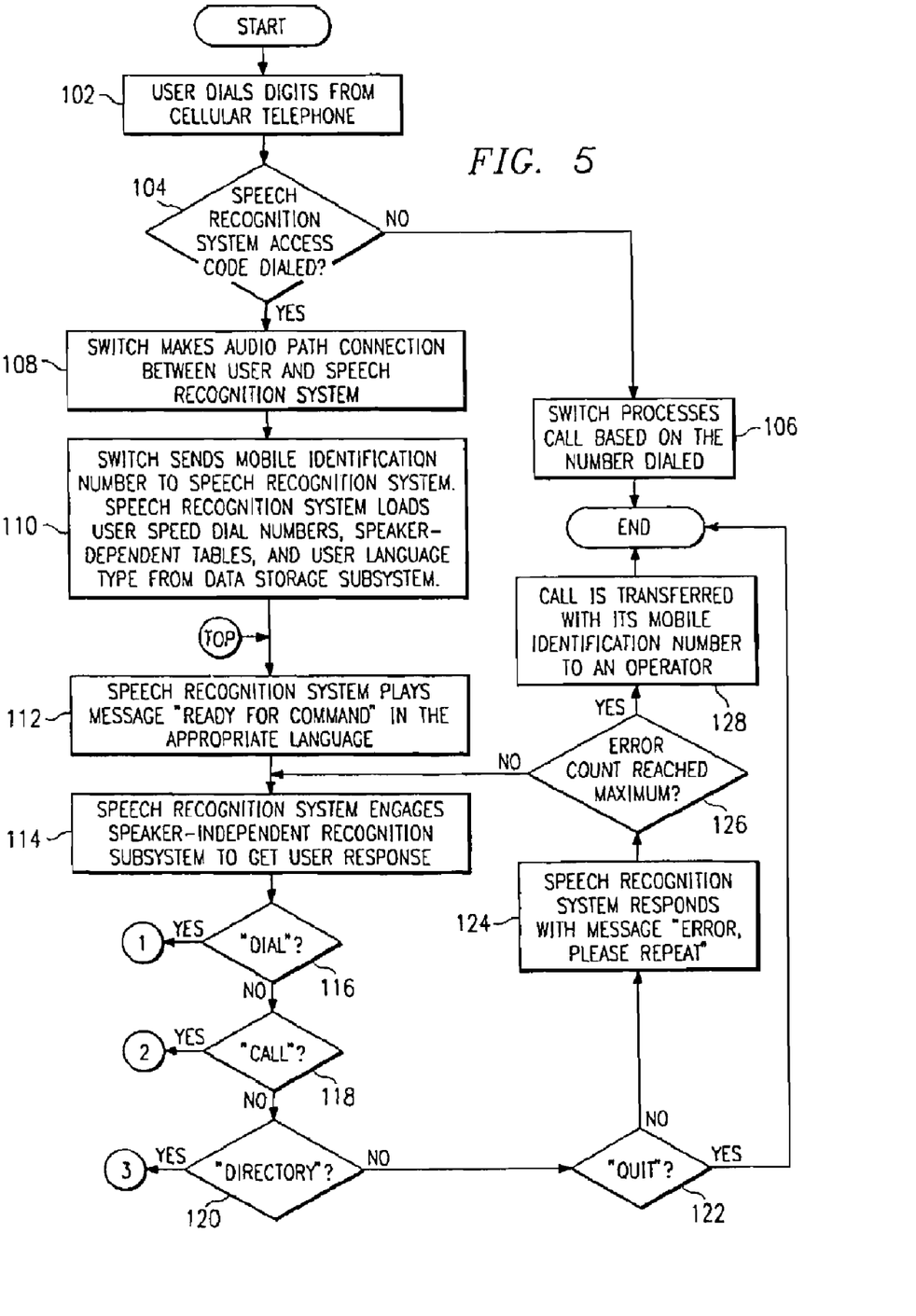
FIG. 5 is a flowchart showing a Control routine used in the Speech Recognition System.

Referring now to FIG. 5, a functional flowchart is provided describing the basic control functions of the Speech Recognition System according to the present invention. The routine begins at step 102 when the user dials digits from the cellular telephone. At step 104, a test is performed to determine if a Speech Recognition System access code has been dialed. If not, the cellular switch processes the call based on the number dialed at step 106 and the routine ends. If the result of the test at step 104 is positive, the routine continues at step 108 during which the switch makes an audio path connection between the user and the Speech Recognition System. At step 110, the switch sends the user's mobile identification number ("MIN") to the Speech Recognition System. As noted above, the MIN is a unique number associated with a given cellular telephone that is available to the switch each time a telephone call is placed.

According to the invention, each user who subscribes to the service will have prerecorded a list of destination numbers. At step 110, these speed-dial numbers, along with speaker-dependent templates and user language type data, are retrieved from the data storage subsystem. As noted above, the data storage subsystem stores such data at predetermined locations that are preferably accessed by the MIN. The routine then continues at step 112 with the Speech Recognition System prompting the user that it is "Ready For Command" or the like. The command is made in the language as determined by the user language type data retrieved at step 110. At step 114, the Speech Recognition Systems engages the speaker-independent recognition sub-system to obtain the user response. Depending on the response, one of several different subroutines follow.

Figure 6A:
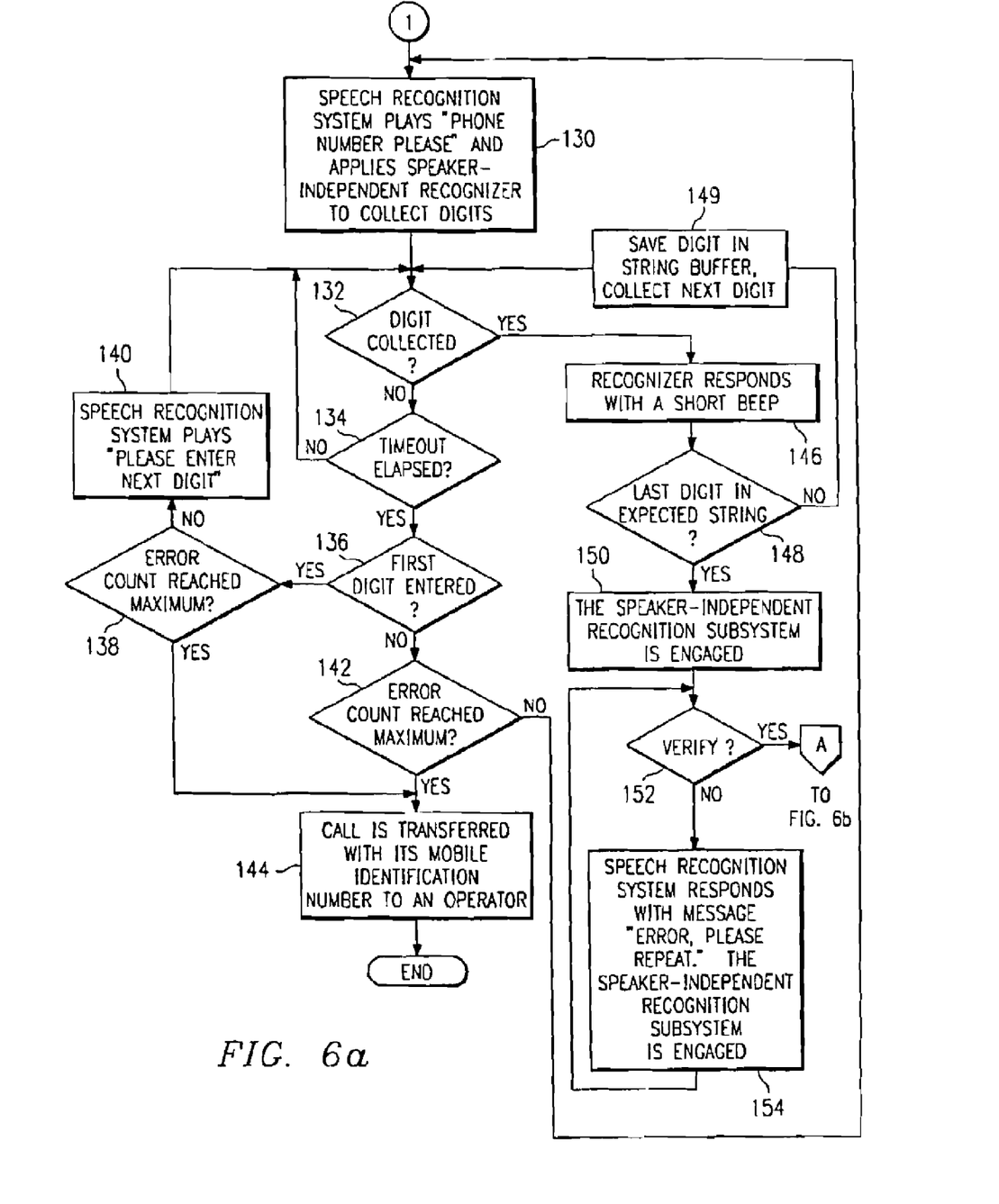
FIG. 6 is a flowchart of the Dial routine of the invention used by the subscriber to voice dial a telephone number that has been previously-stored by the subscriber.
Figure 6B:
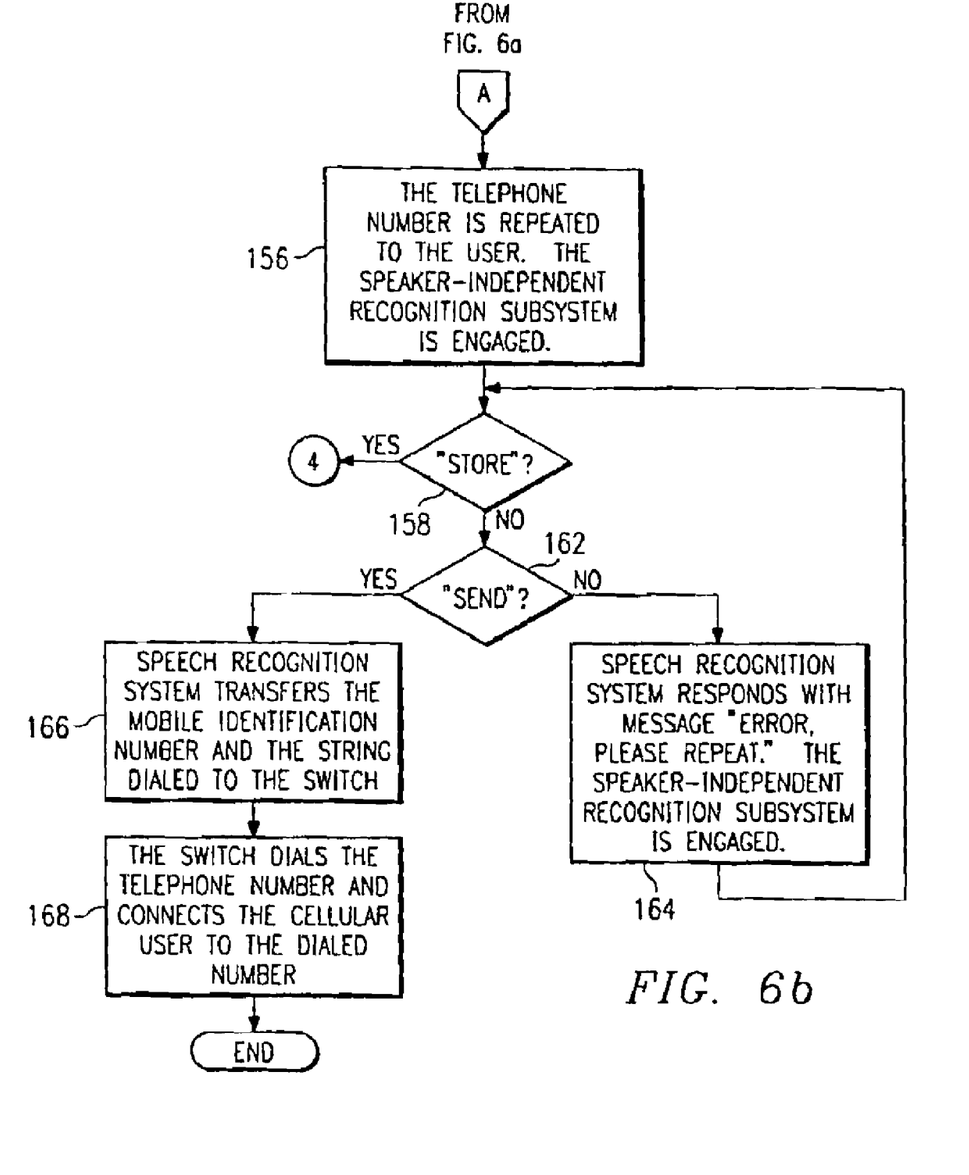

If the user states and the system recognizes a "Dial" command, control is passed to the Dial Routine of FIG. 6. In particular, a test is made at step 116 to determine if the Dial command is recognized. If so, control is transferred to the routine of FIG. 6. If the response to the test at step 116 is negative, a test is made at step 118 to determine if a "Call" command has been spoken and recognized. If the system recognizes a "Call" Command, control is passed to the Call Routine of FIG. 7. If the response to the test at step 118 is negative, a test is made at step 120 to determine if a "Directory" command has been spoken and recognized. If the system recognizes a "Directory" Command, control is passed to the Directory Dialing Routine of FIG. 8.

If the result of the test at step 120 is negative, a test is made at step 122 to determine if the user has spoken a "Quit" command. If so, the routine terminates. If the result of the test at step 122 is negative, the Speech Recognition System responds with an error message in step 124. A test is then performed at step 126 to determine if a predetermined maximum error count has been reached. If not, control is transferred back to step 114. If the predetermined maximum error count has been reached, the call and the MIN is transferred to an operator at step 128 and the routine ends.

Referring now to FIG. 6, the Dial Routine is described in detail. At step 130, the Speech Recognition System prompts the user with a message, such as "Phone Number Please," and applies the speaker-independent recognizer to collect the digits. A test is performed at step 132 to determine whether a digit has been collected. If not, a test is made at step 134 to determine if a predetermined timeout has elapsed. A negative response to the timeout step returns control back to step 132. If the outcome of the test at step 134 is positive, the routine performs a test at step 136 to determine if at least the first digit of the phone number to be called has been entered. If so, another test is performed at step 138 to determine if a maximum error count has been reached. If the outcome of the test at step 138 is negative, the Speech Recognition System prompts the user to "please enter next digit" at step 140 and control returns to step 132.

If, however, the outcome of the test at step 136 is negative, the routine tests to determine whether a maximum error count has been reached at step 142. If not, control returns to step 130 to request the user to enter the phone number. If the outcome of the test at either step 138 or 142 is positive, the call (with the MIN) is transferred to an operator at step 144 and the routine ends.

If the outcome of the test at step 132 is positive, the recognizer preferably responds with a short beep or other audible indication at step 146. A test is then made at step 148 to determine if the digit collected is the last digit expected in the string. If not, the digit is saved in a string buffer at step 149 and the routine returns to step 132 to collect another digit. If, however, the outcome of step 148 is positive, all digits have been collected and the speaker-independent recognition subsystem is engaged at step 150.

At step 152, the subsystem attempts to verify the called number. If the verification command is not recognized, the Speech Recognition System responds at step 154 with a message such as "Error, Please repeat," and control returns back to step 152. If the outcome of the test at step 152 is positive, the telephone number is repeated to the user at step 156 and the speaker-independent recognition subsystem is engaged.

A test is then made at step 158 to determine whether the user (by spoken command) desires to "Store" the number. If yes, the control is transferred to the Store routine of FIG. 9. If the outcome of the test at step 158 is negative, a test 162 is made to determine whether the user has spoken (and the recognizer has recognized) a "Send" command. If not, the Speech Recognition System again plays an error message at step 164 and control is returned to step 158. A positive response to the "Send" test made at step 162 transfers the MIN and the string dialed to the switch for out dialing. Such transfer occurs at step 166. At step 168, the switch dials the telephone number and connects the user to the dialed number.

Figure 7A:
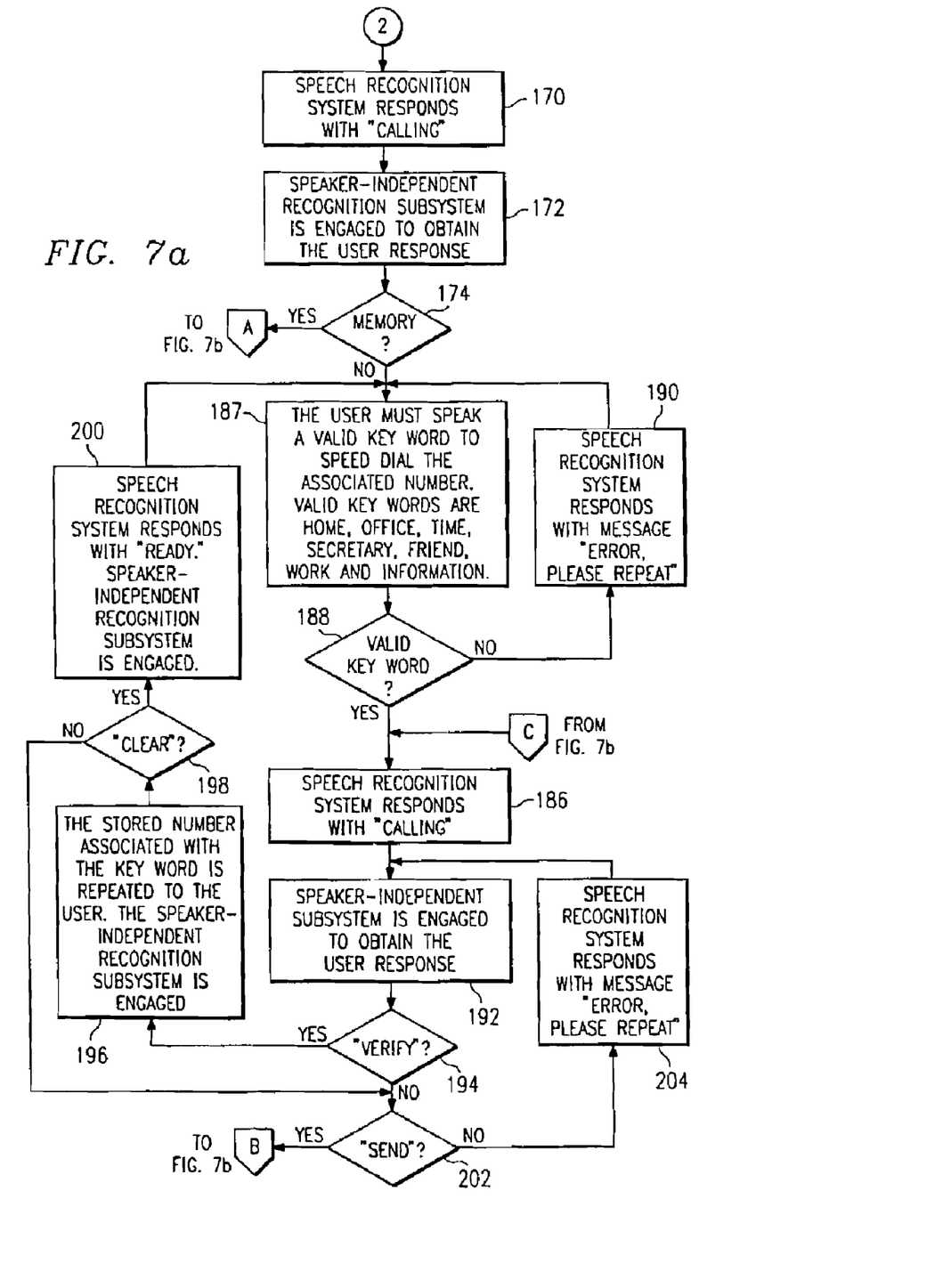
FIG. 7 is a flowchart of the Call routine used by the subscriber to voice dial a speaker-independent telephone number.
Figure 7B:
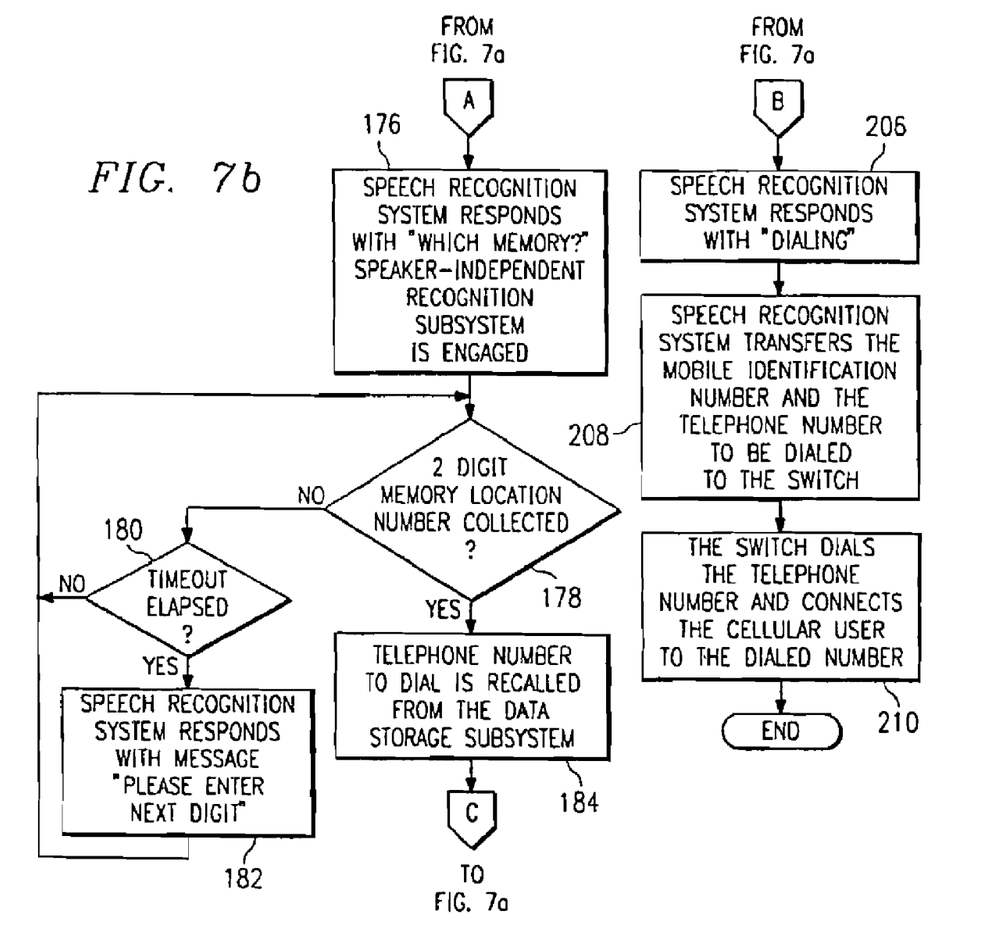

The Call routine is shown in detail in FIG. 7. The routine begins at step 170 during which the Speech Recognition System responds to the user's "Call" command with a message "Calling" At step 172, the speaker independent recognition subsystem is engaged to obtain the user's response. A test is then made at step 174 to determine if the user speaks a "Memory" command, indicating that the number to be called is to be stored and made available for speed-dialing once a preferably two digit memory location number is subsequently received. If the outcome of the test at step 174 is positive, the Speech Recognition System queries the user "Which memory" and engages the recognition subsystem at step 176. At step 178, a test is made to determine if a two digit memory location has been identified by the user. If a two digit memory location has not been identified, a timeout test is performed at step 180. If timeout occurs, the Speech Recognition System prompts the user to "Please enter next digit" at step 182 and control is returned to step 178. A negative outcome of the timeout test also returns control back to step 178.

A positive outcome of the test at step 178 indicates that the two digit memory code has been received. The routine then recalls the previously-stored telephone number associated with the memory code at step 184. The Speech Recognition System then notifies issues a "Calling" message to the user at step 186.

A user may also retrieve the stored telephone number by speaking one of the speaker-independent key words. Thus, if the outcome of the test at step 174 is negative, the routine continues at step 187 with the user speaking a valid key word associated with one or more previously-stored telephone numbers. Without limitation, such key words include HOME, OFFICE, TIME, SECRETARY, FRIEND, WORK and INFORMATION. A test is then made at step 188 to determine if the work spoken is a valid key word. If not, the system responds with an error message at step 190 and asks the user to speak the word again at step 187. A positive outcome to the test at step 188 transfers control to step 186.

At step 192, the speaker-independent subsystem is again engaged to obtain a user command. A test is made at step 194 to determine whether the user desires to "Verify" the number retrieved. If a "Verify" command is spoken and recognized, the stored number associated with the key word is repeated to the user and the recognizer is engaged at step 196. A test is then made at step 198 to determine whether the user desires to "Clear" the number retrieved and start again. If so, the Speech Recognition System responds with a "Ready" message at step 200 and control returns to step 187.

If, however, the outcome of the test at either step 194 or step 198 is negative, a test is made at step 202 to determine if a "Send" command has been spoken and recognized. If not, the system responds with an error message at step 204 and returns to step 192. If the user speaks the "Send" message, the Speech Recognition System responds at step 206 with a "Dialing" message. At step 208, the System transfers the MIN and the telephone number to be dialed to the switch for out dialing. The switch dials the telephone number and connects the user to the dialed number at step 210.

Figure 8:
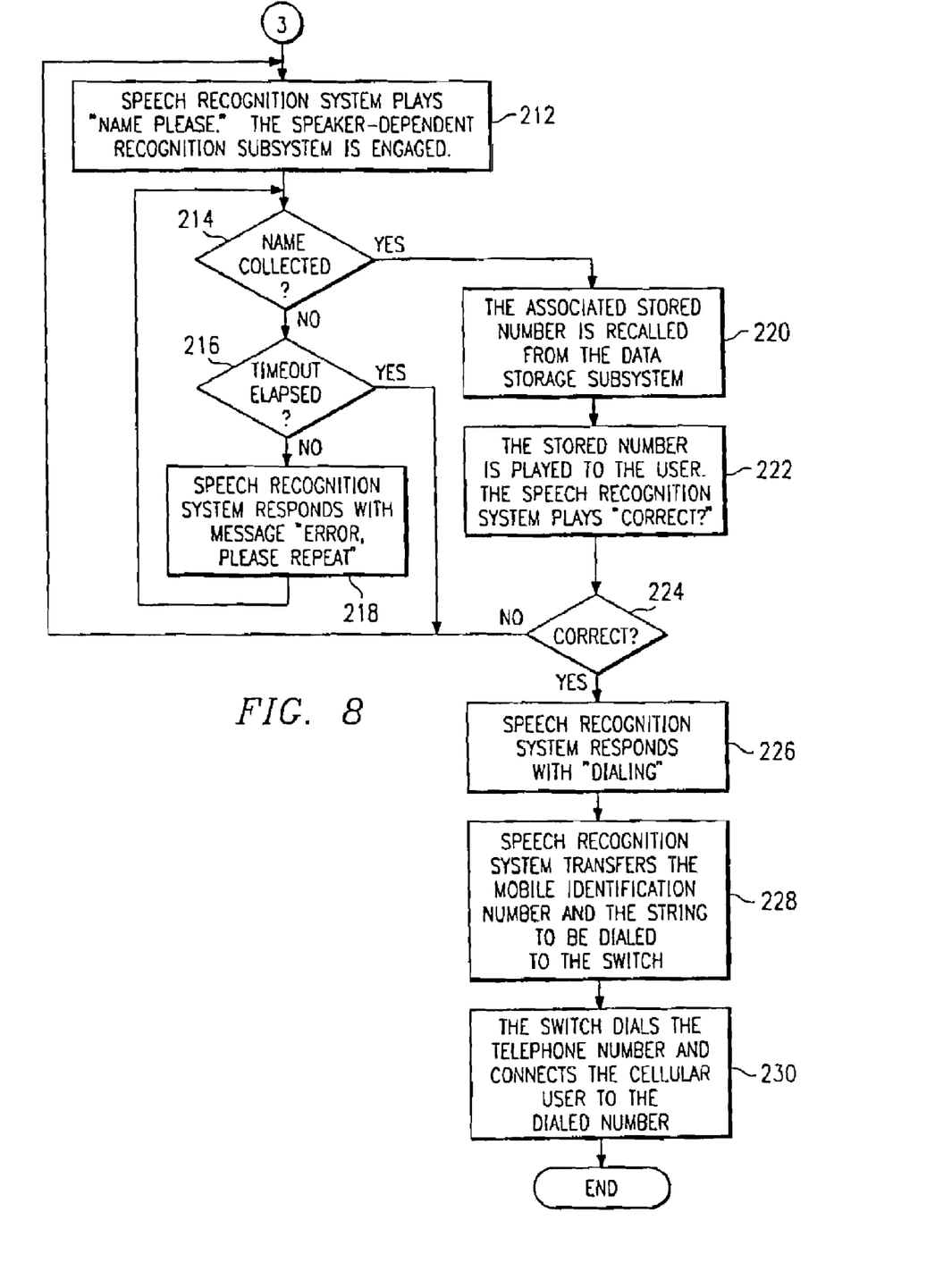
FIG. 8 is a flowchart of the Directory Dialing routine used by the subscriber to recall a previously-stored number using a speaker-dependent directory name.

Referring now to FIG. 8, a flowchart is shown of the Directory Dialing routine. This routine is called when the user desires to recall and dial some previously-stored telephone numbers using a previously-stored speaker-dependent name. In response to the "Directory" command from the user, the routine plays a message at step 212 to request the name in the directory. Step 212 also engages the speaker-dependent recognition subsystem. A test is then made at step 214 to determine if the name has been collected from the speaker. If no response is obtained, a timeout test is performed at step 216. Failure of the speaker to respond before the end of the timeout causes the issuance of an error message at step 218 and the routine returns to step 214. If the timeout occurs without the speaker's response, control is transferred back to step 212.

A positive outcome of the test at step 214 means that the directory name spoken by the user has been recognized. The routine then continues at step 220 and recalls from the data storage subsystem a number associated with such name. At step 222, the stored number is played to the user and the Speech Recognition System issues a "Correct" prompt. A test is then made at step 224 to determine if the number is correct. If not, control is returned back to step 212. If the outcome of the test at step 224 is positive, then the Speech Recognition System responds with a "Dialing" message at step 226. At step 228, the System transfers the MIN and the telephone number to be dialed to the switch for out dialing. The switch dials the telephone number and connects the user to the dialed number at step 230.

Figure 9:
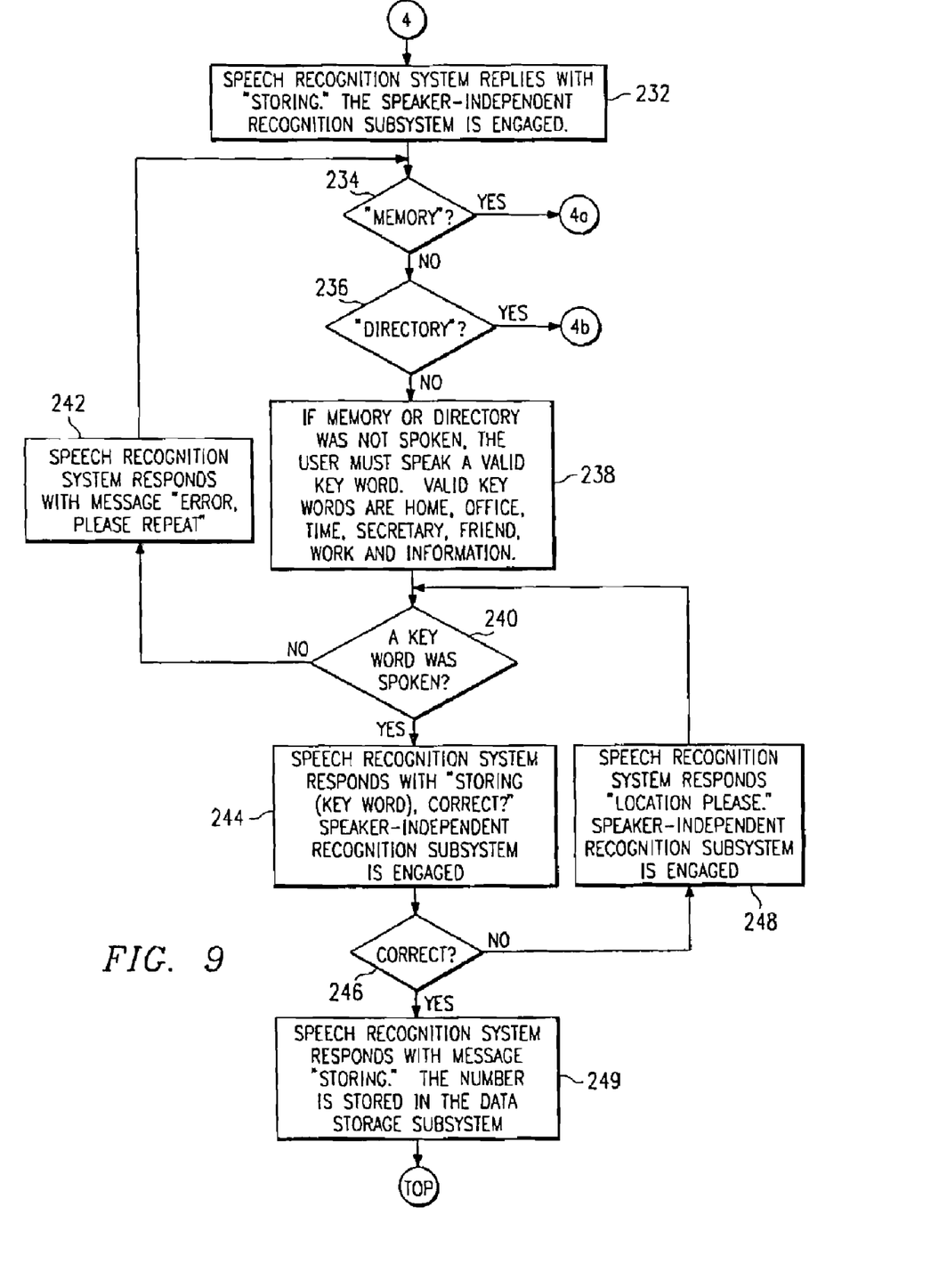
FIG. 9 is a flowchart of a Store routine used to store subscriber-specific destination number information.

Referring now to the Store routine FIG. 9, a flowchart is shown of a routine used by the subscriber to store telephone numbers for the two digit memory codes, keywords, and directory names to be later dialed. The routine begins in response to receipt of a speaker-independent "Store" command spoken by the user to update the speed-dial list whenever necessary. At step 232, the routine responds to the command with a "Storing" message and engages the speaker-independent recognition subsystem. A test is then made at step 234 to determine whether the user desires to store two digit memory codes. If so, control is transferred to the Memory routine of FIG. 10. If the outcome of the test at step 234 is negative, a test is made at step 236 to determine whether the user desires to store a Directory name or a number associated with a Directory name. If so, control is transferred to the Directory Storage routine of FIG. 11. If the outcome of the test at step 236 is negative, then the system will expect to receive a key word for association with the number to be stored at step 238. A test is thus made at step 240 to determine whether the subscriber has spoken a valid key word. If not, the system responds with an error message at step 242 and control is returned to step 234. If the outcome of the test at step 240 is positive, the Speech Recognition System makes an inquiry "Storing (key word), correct" and engages the speaker-independent recognition subsystem at step 244. A test is then made at step 246 to determine if the user selection is correct. If not, the Speech Recognition System issues a "Location, please" prompt at step 248 and returns to step 240. A positive outcome of the test at step 246 causes the system to issue a "Storing" prompt while a number associated with the keyword is stored in the data storage subsystem in step 249. Control is then returned to step 112 in FIG. 5.

Figure 10:
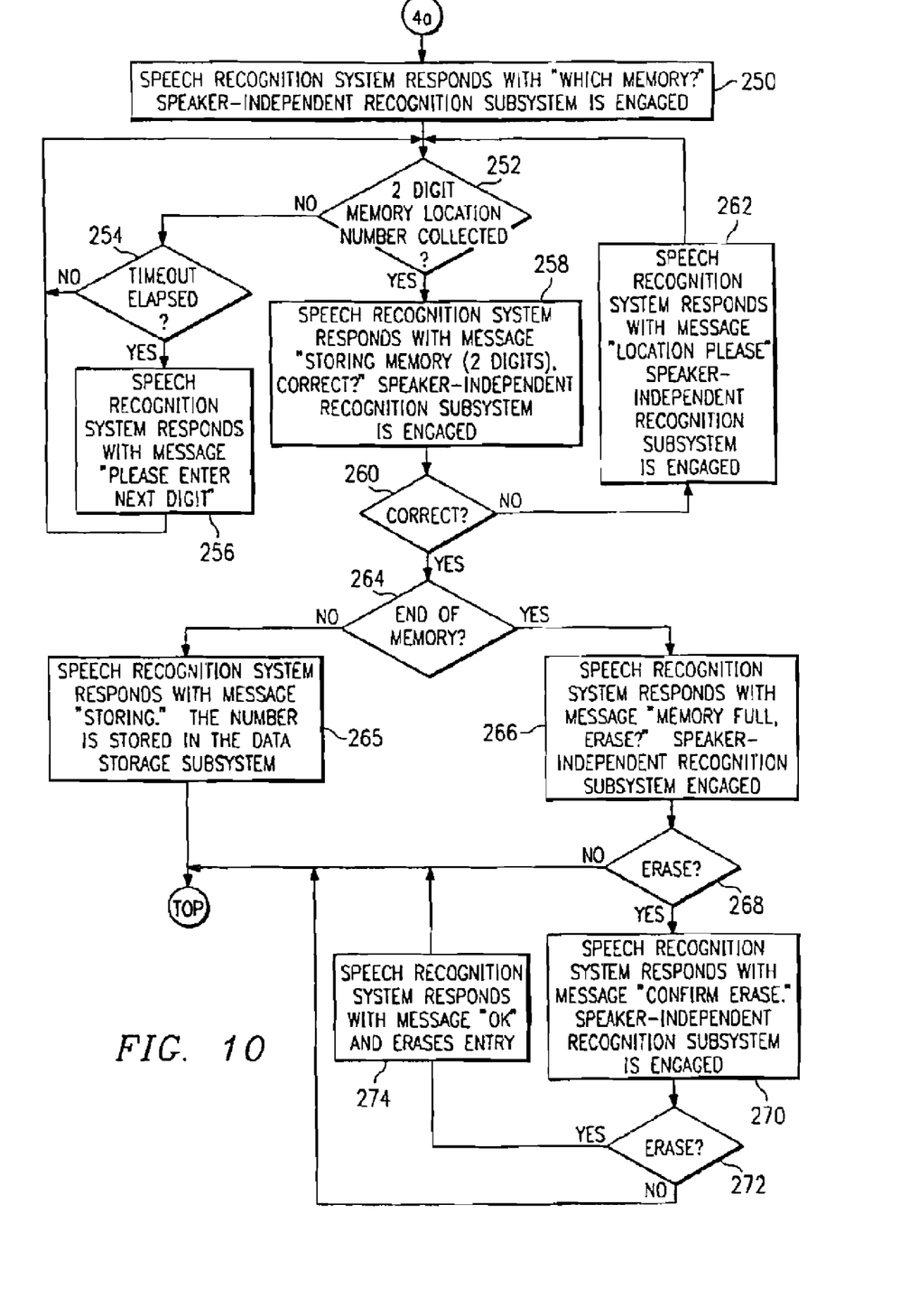
FIG. 10 is a flowchart of a Memory routine used to store speed-dial numbers associated with specific memory locations.

The Memory routine is shown in FIG. 10. The routine begins at step 250 by inquiring "Which memory" and engages the speaker-independent recognition sub-system. At step 252, a test is made to determine if a two digit memory location number has been collected from the user. A timeout test is then performed at step 254. If timeout occurs, the Speech Recognition System prompts the user to "Please enter next digit" at step 256 and control is returned to step 252. A negative outcome of the timeout test also returns control back to step 252.

A positive outcome of the test at step 252 indicates that the two digit memory code has been collected from the subscriber. At step 258, the Speech Recognition System responds with a message "Storing memory (2 digits), correct" and engages the speaker-independent recognition sub-system. A test is then made at step 260 to confirm that the subscriber is storing the telephone number in the appropriate location. If not, the Speech Recognition System issues a "Location, please" prompt at step 262 and returns to step 252. A positive outcome of the test at step 260 then causes the routine to test at step 264 whether the memory is already filled up with stored codes. If not, the system issues a "Storing" message and stores the number in the data storage subsystem at step 265. If, however, the response to the test at step 264 is affirmative, the Speech Recognition System issues a "Memory full, erase?" message and engages the speaker-independent recognition subsystem at step 266. A test is then performed at step 268 to determine whether the speaker wishes to erase a memory location. If not, control returns to step 112 in FIG. 5.

If the subscriber desires to erase a given memory location code, the system issues a "Confirm erase" message at step 270 and engages the speaker-independent recognizer. An erase test is then performed again at step 272 to confirm that the subscriber wishes to erase the specified memory location. A negative outcome of the test at step 272 returns control to step 112 in FIG. 5. A positive outcome of the erase test at step 272 causes the system to issue an acknowledgment at step 274. Control then returns to step 112 in FIG. 5.

Figure 11:
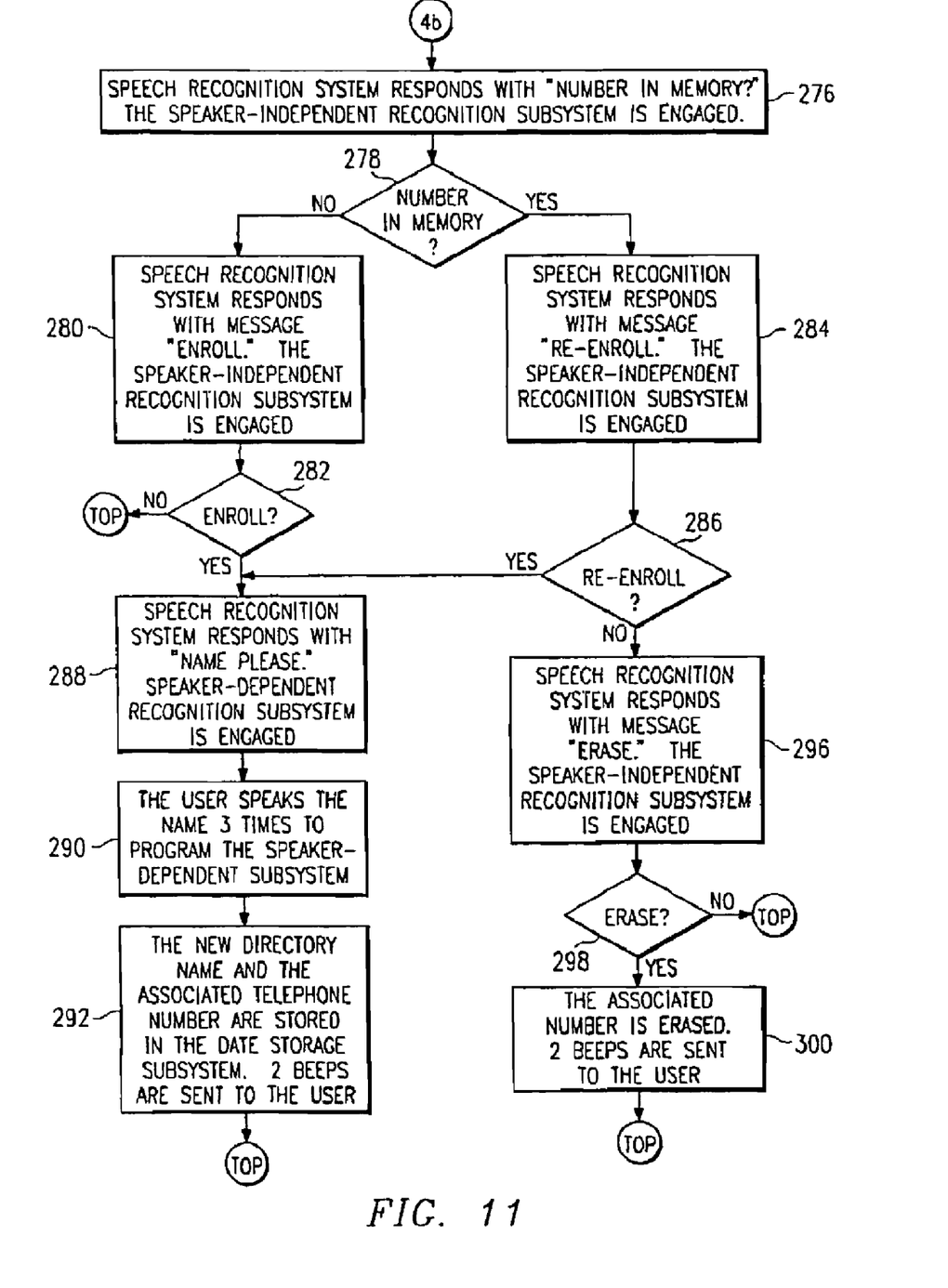
FIG. 11 is a flowchart of a Directory Storage routine used to store speaker-dependent directory names and associated telephone numbers for use by the subscriber to speed-dial destination numbers based on the associated directory names.

Referring now to FIG. 1, a flowchart is shown of the Directory Storage routine. The routine begins at step 276 in response to a positive response to the Directory inquiry performed in step 236 in FIG. 9 (i.e., receipt of the Directory command). Step 276 issues a prompt to the subscriber to determine if a "Number in Memory" has been previously associated with a Directory name. A test is then performed at step 278 to determine if the Number in memory has been previously stored. If not, the Speech Recognition System responds by issuing an "Enroll" message and engages the speaker-independent recognition subsystem at step 280. A test is then made at step 282 to determine whether the subscriber wishes to enroll. If not, the routine terminates and returns to step 112 in FIG. 5.

If the outcome of the test at step 278 is affirmative, the Speech Recognition System issues a message "Re-enroll" and engages the speaker-independent recognition subsystem at step 284. A test is then made at step 286 to determine whether the subscriber wishes to re-enroll the directory name. If yes, or if the outcome of the test at step 282 is positive, the routine continues at step 288 and issues a "Name Please" message and engages the speaker-dependent recognition subsystem. The user then speaks the name a predetermined number (e.g., three (3) times) at step 290 to program the speaker-dependent subsystem. The new directory name and the associated telephone number are then stored in the data storage subsystem in step 292. Control is then returned to step 112 in FIG. 5.

If the outcome of the test at step 286 is negative, the Speech Recognition System issues a message "Erase" and engages the speaker-independent recognition subsystem at step 296. A test is then made at step 298 to determine whether the subscriber wishes to erase the directory number. If so, the associated number is erased at step 300. Control is then returned to step 112 in FIG. 5.

It should be appreciated that the specific names of the commands are merely exemplary and should not be taken by way of limitation. Other suitable command names are of course suitable.

As noted above, each cellular telephone is uniquely identified with its MIN and ESN. In the prior art, the service provider operates the MTX 12 and keeps a database of all MIN's (and their associated ESN's). Each time a call is placed by the cellular telephone, the service provider verifies whether the MIN and the associated ESN are authorized. If the MIN and ESN of a cellular phone are not recognized in the switch database, the provider normally allows the call to proceed at least one time. If billing authorization cannot later be verified, however, the MIN and serial number are then placed on an exception list. Subsequent attempts to use the MIN will then be rejected.

Such fraudulent use of the cellular network is ameliorated by the present invention. According to another feature of the invention, the Speech Recognition System also includes a positive identification function that enables the system under certain circumstances to test whether the user associated with a received MIN (whether in or out of the service area) is an authorized subscriber to the service. For example, after a call is voice-dialed and the Send command is spoken, the system might prompt the caller to answer one or more personal questions. Thus, the caller might be requested to speak the social security and/or account number of the subscriber (purportedly associated with the MIN and ESN). Alternatively, the caller can be prompted to enter such identifying information manually through the telephone keypad. Of course, the nature and scope of the personal information requested by the system depends entirely on the system operator and the degree of security sought by the subscriber and operator.

Such a system could also be used to prevent a local call being placed from a stolen vehicle, for example, i.e., even if the MIN was recognized in the service provider's database. It could also be used to limit access to the voice-dialing function from the subscriber's phone to certain persons. Thus the subscriber may limit his or her children or others from using the phone without the subscriber's knowledge. If the user cannot provide proper answers to such questions, the system rejects the SEND command and the call is terminated. Correct entry of the requested information enables the caller to continue his or her access to the service.

Alternatively the identification function may be implemented in conjunction with a speaker verification function in which the user's identity must first be verified with some spoken predetermined personal identification code. If the verification function is not "convinced" that the person is who he or she claims to be, the identification function is then executed to ask the follow-up questions. One such system is described in copending application Ser. No. 07/523,486, filed May 15, 1990, to Hunt et al, titled "Simultaneous Speaker- Independent Voice Recognition And Verification Over A Telephone Network," assigned to the assignee of the present invention.

The present invention has numerous advantages over the prior art. The system combines the use of both speaker-dependent and speaker-independent speech recognition in a mobile or portable telephone communications network environment. Multiple language prompts are spoken from and available simultaneously on multiple ports from a single automated telecommunications-based system. The language selected is based on the language spoken by the user. The system advantageously stores user specific speaker-dependent and speaker-independent speech information with particular user-based addresses.

The invention successfully implements speech recognition in the cellular telephone or personal communications network. Non-wireline networks provide a special challenge to both the recognition algorithm developers as well as the applications developers. The recognition algorithm in conjunction with the system application is insensitive to the radio fading, speech clipping, and speech compression conditions that occur in a non-wireline network. In addition, the recognition algorithm accommodates conditions found in the standard switched network. The invention provides a means of accurately recognizing speech that has limited distortion due to clipping or fading and provides a means of reprompting the user for input when the speech has become too distorted for accurate recognition.

Previously, only the best examples of spoken words have been used as tokens for developing speech vocabularies. By collecting speech that has been compressed or that although distorted by radio fading or clipping is still intelligible and by adding this collected speech to the speech training database, the vocabulary based on such data becomes more robust and less sensitive to these conditions. Adding the distorted but intelligible data to the training database of excellent example words allows for a more diverse statistical representation of each vocabulary word. Words that might have been previously rejected, because part of the word was clipped can now be recognized if enough intelligible information is available. If the statistical representation of the word indicates that not enough information is available for accurate recognition, the recognition system will reject the word and reprompt the user for input.

The invention also enables real-time vocabulary uploading. Previously, speech recognition vocabularies were stored in memory and were not updated or totally changed during the operation of an application. The present invention solves the problem of allowing speech recognition vocabularies to be loaded into a recognition system while an application is in operation. This capability allows for less high speed memory to be used in a system, because an entire set of vocabularies is not required to be resident in memory at one time. This capability also allows for efficient memory management when multiple languages are used, because only the language required by the system user need be resident in memory at any one time. Previously, all possible languages required by users would have been stored in memory simultaneously.

Both continuous and discrete recognition techniques are used in the Speech Recognition System of the present invention.

It should be appreciated by those skilled in the art that the specific embodiments disclosed above may be readily utilized as a basis for modifying or designing other structures for carrying out the same purposes of the present invention. It should also be realized by those skilled in the art that such equivalent constructions do not depart from the spirit and scope of the invention as set forth in the appended claims.

What is claimed is:

1. A method for voice activated dialing in a mobile telecommunications system, the method comprising:
   receiving a voice input from a wireless network user;
   determining a telephone number to be dialed by:
      using speaker independent speech recognition to interpret a string of spoken digits in the voice input to determine the telephone number; and
      using speaker dependent speech recognition to interpret a spoken person name in the voice input to determine the telephone number; and
   initiating a telephone call by dialing the telephone number.

2. A method according to claim 1, further comprising:
   after receiving the voice input, verifying the voice input by repeating it back to the user.

3. A method according to claim 1, further comprising:
   before initiating the telephone call, verifying the user's identity.

4. A method according to claim 1, further comprising:
   before receiving the voice input, prompting the user to enter the voice input.

5. A voice activated dialing apparatus using a method according to any one of claims 1-4.

6. A wireless communications network using a method according to any one of claims 1-4.

7. A system for voice activated dialing in a mobile telecommunications system, the system comprising:
   means for receiving a voice input from a wireless network user;
   means for determining a telephone number to be dialed by:
      using speaker independent speech recognition to interpret a string of spoken digits in the voice input to determine the telephone number; and
      using speaker dependent speech recognition to interpret a spoken person name in the voice input to determine the telephone number; and
   means for initiating a telephone call by dialing the telephone number.

8. A system according to claim 7, further comprising:
   means for verifying the voice input after receiving it by repeating the voice input back to the user.

9. A system according to claim 7, further comprising:
   means for verifying the user's identity before initiating the telephone call.

10. A system according to claim 7, further comprising:
    means for prompting the user before receiving the voice input to enter the voice input.

11. A computer program product in a computer readable storage medium for execution on at least one processor of a method of voice activated dialing in a mobile telecommunications system, the computer program product having instructions for execution on the at least one processor comprising:
    program code for receiving a voice input from a wireless network user;
    program code for determining a telephone number to be dialed by:
       using speaker independent speech recognition to interpret a string of spoken digits in the voice input to determine the telephone number; and
       using speaker dependent speech recognition to interpret a spoken person name in the voice input to determine the telephone number; and
    program code for initiating a telephone call by dialing the telephone number.

12. A product according to claim 11, further comprising: program code for verifying the voice input after receiving it by repeating the voice input back to the user.

13. A product according to claim 11, further comprising: program code for verifying the user's identity before initiating the telephone call.

14. A product according to claim 11, further comprising: program code for prompting the user to enter the voice input before receiving the voice input.

* * * * *